(12) United States Patent
Bauer et al.

(10) Patent No.: US 6,464,768 B1
(45) Date of Patent: Oct. 15, 2002

(54) WATER-SOLUBLE STILBENE DYES, THEIR PREPARATION AND USE

(75) Inventors: Wolfgang Bauer, Maintal (DE); Heidemarie Menzel, Bad Soden (DE); Josef Geisenberger, Sulzbach (DE); Reinhard Pedrazzi, Allschwil (CH)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/351,221

(22) Filed: Jul. 12, 1999

(51) Int. Cl.[7] .................... C09D 11/02; C09B 56/04

(52) U.S. Cl. .................... 106/31.52; 534/689

(58) Field of Search ................ 106/31.52; 534/689, 534/690

(56) References Cited

U.S. PATENT DOCUMENTS

| | | | | |
|---|---|---|---|---|
| 3,905,949 A | * | 9/1975 | Perkins et al. ............. | 534/689 |
| 4,390,470 A | * | 6/1983 | Wicki et al. ............... | 534/689 |
| 4,465,491 A | | 8/1984 | Balliello et al. ............ | 8/524 |
| 4,940,783 A | * | 7/1990 | Stingelin ................... | 106/31.52 |
| 4,954,133 A | | 9/1990 | Oppliger ................... | 534/689 |
| 5,431,723 A | * | 7/1995 | Bermes et al. ............. | 106/31.52 |
| 5,739,298 A | * | 4/1998 | Misawa et al. ............. | 534/689 |
| 5,891,227 A | * | 4/1999 | Hoffmann et al. ......... | 106/31.52 |
| 6,024,785 A | * | 2/2000 | Morimoto ................. | 106/31.52 |
| 6,036,760 A | * | 3/2000 | Bermes ..................... | 106/31.52 |

FOREIGN PATENT DOCUMENTS

| | | |
|---|---|---|
| DE | 32 47 605 | 7/1983 |
| EP | 0 0571 58 | 8/1982 |
| EP | 0146747 | 7/1985 |
| EP | 0841378 | 5/1998 |
| GB | 0 049 326 | 10/1975 |

OTHER PUBLICATIONS

EPO Search Report, Nov. 1999.
Derwent Patent Family Abstract of EP 0841378, May 1998.

* cited by examiner

*Primary Examiner*—Helene Klemanski
(74) *Attorney, Agent, or Firm*—Scott E. Hanf

(57) ABSTRACT

The invention relates to a dye

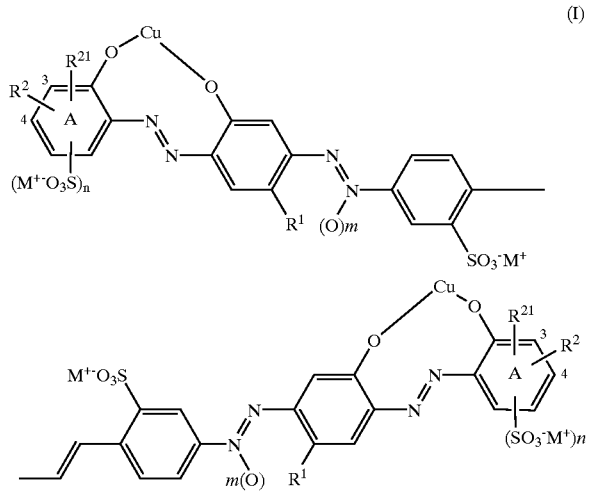

in which $R^1$ is hydrogen, alkyl of 1 to 4 carbon atoms, or alkoxy of 1 to 4 carbon atoms;

$R^2$ is hydrogen, carboxyl, chloro or nitro;

$R^{21}$ is hydrogen; or $R^2$ and $R^{21}$ together form a benzene ring which is fused on in positions 3 and 4 of the ring A and can carry 1, 2 or 3 sulfo groups;

m is a number from 0 to 1; n is a number from 1 to 2;

$M^+$ is a cation or a mixture of different cations, at least one equivalent of the cations $M^+$ per mole of the dye being lithium cations and/or cations of the formula (II)

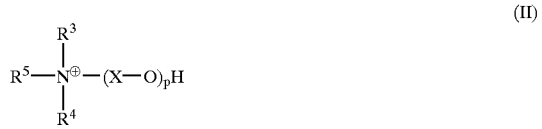

where p is a number from 1 to 30;

X is $CH_2CH_2$, $CH(CH_3)CH_2$, $CH_2CH(CH_3)$ or a combination thereof and $R^3$, $R^4$ and $R^5$ independently of one another are hydrogen, a group of the formula (III)

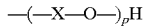

or an aliphatic radical of 1 to 18 carbon atoms.

Dyes of the formula (I) are particularly suitable as colorants in inkjet inks.

15 Claims, No Drawings

WATER-SOLUBLE STILBENE DYES, THEIR PREPARATION AND USE

CROSS-REFERENCES TO RELATED APPLICATIONS

The present invention is described in the German priority application No. 198 31 095.1, filed Jul. 10, 1998, which is hereby incorporated by reference as is fully disclosed herein.

BACKGROUND OF THE INVENTION

The inkjet process constitutes a contactless printing process in which droplets of the recording liquid are guided from one or more nozzles onto the substrate that is to be printed. A recording liquid consists in principle of a soluble dye which is in solution in a solvent, usually water, or in a solvent mixture. In general, the solution additionally comprises further auxiliaries, such as surface-active substances, humectants and/or preservatives, for example. In order to obtain prints of high definition and resolution, recording liquids for the inkjet printing process must meet very stringent requirements in terms, in particular, of purity, freedom from particles, storage stability, viscosity, and surface tension. These and other requirements dictate that the dyes employed to prepare the recording liquids shall contain virtually no salts or diluents and must in particular possess high solubility.

In addition, very exacting requirements are made with regard to color strength, brightness, light fastness, water fastness and rub fastness. The inkjet process and the requirements made of the dyes and recording liquids are described, for example, in Ullmann's Encyclopedia of Industrial Chemistry, 5$^{th}$ Edition, Vol.A 13 (1989), 588–594.

The development of water-soluble black dyes for the inkjet printing process that have the desired combination of high color strength, high light fastness and good water fastness has hitherto proved very difficult (see for example P. Gregory, High-Technology Applications of Organic Colorants, Plenum Press, New York (1991), p. 195).

High light fastness is of great importance in particular for inkjet applications in outdoor areas and in connection with the production of inkjet prints of photographic quality.

There is therefore a need for water-soluble dyes which are superior in light fastness to the known black dyes and at the same time have the other properties required for the inkjet sector.

Black stilbene dyes have already been described in various patents. These dyes, prepared originally for the dyeing and printing of textile fibers, are in the form of, in particular, sodium salts and as a result of their preparation conventionally include considerable amounts of salts such as, for example, sodium sulfate, sodium acetate and, in particular, sodium chloride.

In addition, diluents are added to these pulverulent dyes, examples of said diluents being sodium carbonate, alkali metal phosphates, urea, and aliphatic carboxylic acids.

Solid preparations of water-soluble stilbene dyes of the formula (A)

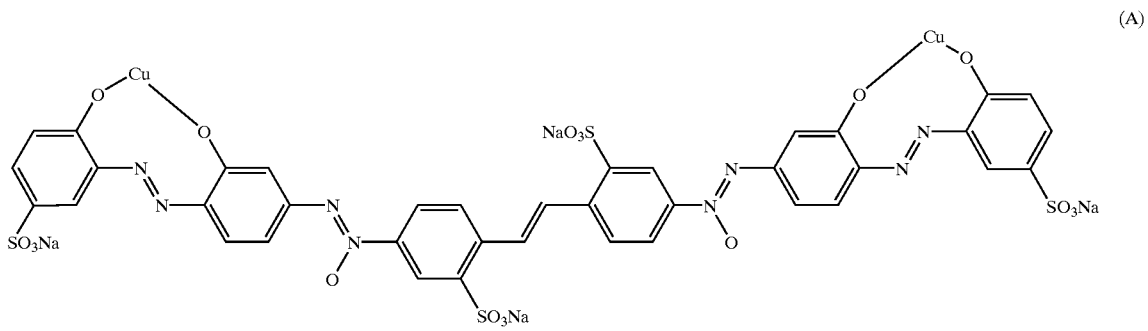

are described, for example, in EP-A-0 057 158 and in DE-A-3 247 605.

Salt-containing dyes of this kind are unsuitable for the preparation of recording liquids for the inkjet printing process because, in particular, corrosion occurs at the nozzles, but also because of the inadequate solubility of the dyes and poor storage stability of the printing inks, which are associated with an increase in viscosity, the deposition of dye, and the blockage of the nozzles. Furthermore, disadvantages arise in respect of the surface tension, so preventing optimum ink-drop formation for use in the inkjet printing process.

Dyes of the formula (A) have been employed for the inkjet printing process in an insoluble form bound to organic or inorganic particles (EP-A-0 656 406) and for printing textile fibers, especially polyamide fibers (EP-A-0 583 133).

The inks employed in accordance with EP-A-0 583 133 for printing textile fibers contain sodium hydroxide, in order to establish an alkaline pH, and are present predominantly as sodium salts.

Because of the poor solubility of the sodium salt of the stilbene dye of the formula (A), however, this dye is not suited to the preparation of printing inks for the inkjet printing process.

The object was therefore to provide black dyes for the inkjet printing process which do not have the disadvantages of the known dyes and yet meet the abovementioned requirements on color strength, brightness, light fastness and fastness to water and rubbing.

SUMMARY OF THE INVENTION

The present invention relates to water-soluble black stilbene dye salts and to their use for preparing recording liquids for the inkjet process.

The present invention provides black stilbene dyes of the formula (1)

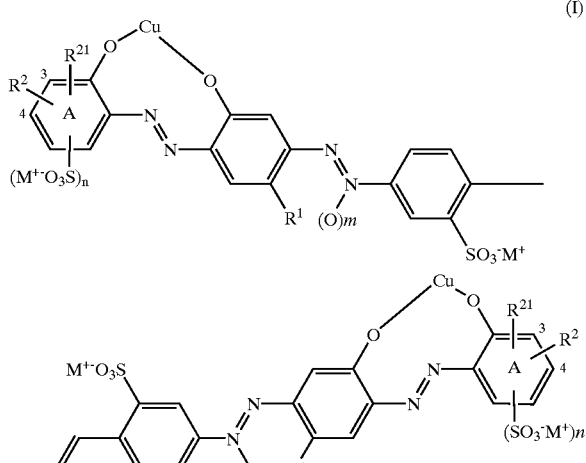

in which
R$^1$ is hydrogen, alkyl of 1 to 4 carbon atoms, or alkoxy of 1 to 4 carbon atoms;

R$^2$ is hydrogen, carboxyl, chloro or nitro;

R$^{21}$ is hydrogen; or R$^2$ and R$^{21}$ together form a benzene ring which is fused on in positions 3 and 4 of the ring A and can carry 1, 2 or 3 sulfo groups;

m is a number from 0 to 1;

n is a number from 1 to 2;

M$^+$ is a cation or a mixture of different cations, at least one equivalent of the cations M$^+$ per mole of the dye being lithium cations and/or cations of the formula (II)

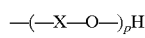

where p is a number from 1 to 30;

X is CH$_2$CH$_2$, CH(CH$_3$)CH$_2$, CH$_2$CH(CH$_3$) or a combination thereof and R$^3$, R$^4$ and R$^5$ independently of one another are hydrogen, a group of the formula (III)

—(—X—O—)$_p$H    (III)

or an aliphatic radical of 1 to 18 carbon atoms.

DESCRIPTION OF THE PREFERRED EMBODIMENTS

Preference is given to dyes of the formula (I) in which M$^+$ is lithium cations or cations of the formulae (II) in which p is a number from 1 to 15. Particularly preferred dyes of the formula (I) comprise mixtures of lithium cations and cations of the formula (II).

Preference is also given to dyes of the formula (I) in which the definition of R$^{21}$ is hydrogen.

Preference extends to the dyes of the formula (I) in which R$^1$ is hydrogen, methyl, ethyl, methoxy or ethoxy.

Particularly preferred dyes are those of the formula (IB)

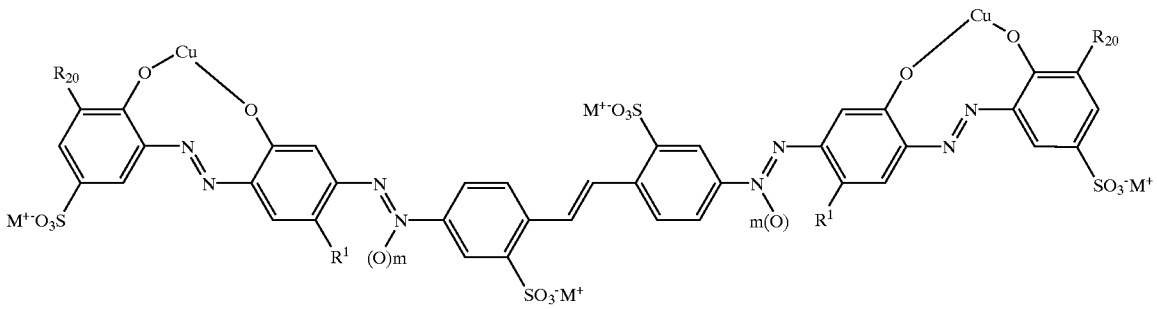

in which R$^1$, M and m are as defined above and R$^{20}$ is hydrogen, sulfo, chloro, nitro or carboxyl.

The preparation of the stilbene dyes in the form of the sodium salts is known per se and is described, for example, in Houben-Weyl, Methoden der Organischen Chemie, Vol. X/3 (1965), pp. 339–343.

Accordingly, stilbene dyes are synthesized by alkaline condensation of 4,4'-dinitrostilbene-2,2'-disulfonic acid of the formula (IV)

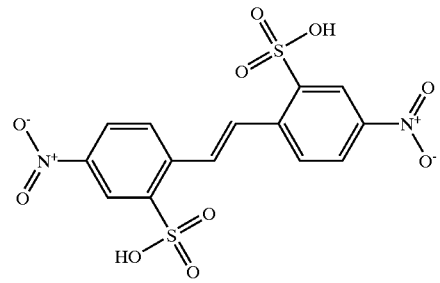

with amino azo compounds in the form of their copper complexes of the formula (V)

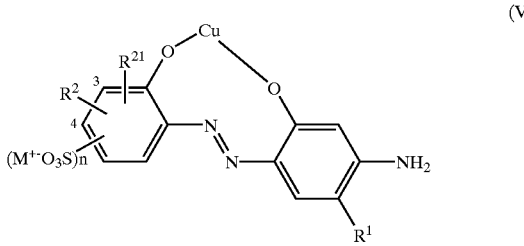

Aternatively, formation of the copper complex can be carried out after the alkaline condensation.

Since the alkaline condensation of 4,4'-dinitrostilbene-2, 2'-disulfonic acid with amino azo compounds in accordance with the methods stated is performed with sodium hydroxide, the dyes prepared in this way are in the form of sodium salts. The lithium or ammonium salts of stilbene dyes of the formula (I) according to the invention are prepared, for example, by adjusting the sodium salts of the corresponding stilbene dyes in an aqueous medium to a pH of between 0 and 3, preferably between 0 and 2, using an acid, separating off the resultant dye acids, washing them and then combining them in an aqueous medium with lithium hydroxide and/or with the lithium salt of a sufficiently weak acid and/or with an amine of the formula (VI) or with an ammonium hydroxide of the formula (VII)

$$R^3R^4N(-X-O-)_pH \quad (VI)$$

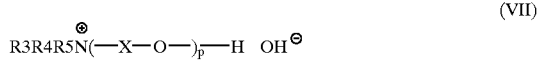

$$R3R4R5N^{\oplus}(-X-O-)_p-H \quad OH^{\ominus} \quad (VII)$$

in which $R^3$, $R^4$, $R^5$, X and p are as already defined above to form dye salts of the formula (I) according to the invention. Acids suitable for preparing the abovementioned dye acids are inorganic acids, such as hydrochloric acid, sulfuric acid, nitric acid or phosphoric acid, or organic acids, such as trichloroacetic acid, methanesulfonic acid, trifluoromethanesulfonic acid or polystyrenesulfonic acid. It is also possible to use a mixture of organic or inorganic acids.

Conversion of the sodium salts of dyes of the formula (I) to the corresponding dye acids is preferably done by introducing the sodium salt into the aqueous solution of the organic and/or inorganic acid and then stirring the resultant suspension at temperatures between 25 and 80° C., preferably from 40 to 60° C., for a certain time, such as from 0.5 to 4 hours. The dye acid is normally separated off by filtration but can also be isolated, for example, by centrifugation.

Once isolated, the dye acid is judiciously washed with dilute mineral acids and/or organic solvents, preferably methanol, ethanol, n-propanol, isopropanol or ethylene glycol dimethyl ether, in order to remove the majority of the electrolyte.

Examples of lithium compounds of organic or inorganic acids that are required to neutralize the dye acid are lithium hydroxide, lithium carbonate, lithium sulfite, lithium borate, trilithium phosphate, and lithium acetate.

The lithium cation is preferably introduced using lithium hydroxide or lithium carbonate. The dye acids can also be reacted with a mixture of lithium hydroxide and/or one or more lithium salts of sufficiently weak acids and/or one or more amines of the formula (VI) or ammonium hydroxides of the formula (VII).

Alternatively, dyes of the formula (I) can be prepared by using aqueous lithium hydroxide instead of sodium hydroxide for the alkaline condensation of the precursors of the formulae (IV) and (V), at a temperature of from 60 to 140° C. and under pressure if desired. In this case, the lithium salts of the dyes of the formula (I) are formed directly.

Highly advantageous dye salts of the formula (I) according to the invention include both lithium cations and ammonium cations of the formula (II). These dye salts are obtained when the dye acids which form are reacted with a mixture of lithium cation donors and one or more amines of the formula (VI) or ammonium hyroxides of the formula (VII). The amines of the formula (VI) are known and/or commercial substances; p is preferably a number from 1 to 15.

Examples of suitable amines of the formula (VI) are ethanolamine, diethanolamine, triethanolamine, N-methyl-N-ethanolamine, N-methyl-N-diethanolamine, 2-(2-hydroxyethoxy)ethana mine, di(2-(2-hyd roxyethoxy)ethan )a mine, tri(2-(2-hydroxyethoxy)ethan)amine, ethoxylated and propoxylated ammonia, primary, secondary and tertiary aliphatic amines having 1 or 2 $C_1$–$C_{18}$-alkyl radicals and 2 or 1 (poly)oxy($C_2$–$C_3$)-alkylene chains having from 1 to 30, preferably from 1 to 25, hydroxyethyl and/or hydroxypropyl units in the chain. Ethoxylated fatty amines are available commercially under various names, for example, as ®Genamins from Clariant. They usually comprise ethoxylated coconut fatty amine, sperm oil fatty amine, stearylamine and tallow fatty amine having degrees of ethoxylation of generally from 2 to 25. These products are industrial mixtures corresponding to the composition of the fatty acids used to prepare the fatty amines.

It can be judicious to employ a mixture of ethanolamine and/or diethanolamine and/or triethanolamine and a commercial ethoxylated fatty amine with degrees of ethoxylation of from 2 to 25.

In the reaction of the dye acids with lithium compounds and/or with an amine of the formula (VI) or with an ammonium hydroxide of the formula (VII) it is preferred to choose an amount which in the aqueous medium is required for the establishment of a pH of from 7 to 10, preferably of from 8 to 9.

Alternatively, the sodium salts of black stilbene dyes in preferably aqueous solution can be converted, using ammonium salts of lipophilic amines, examples being tri-n-butylamine, tri-n-pentylamine, tri-n-hexylamine and tri(2-ethylhexyl)amine, into the corresponding water-insoluble or sparingly water-soluble ammonium salts of stilbene dyes of the formula (I), which can subsequently be separated off and washed free of salt. Subsequent reaction with preferably lithium hydroxide in aqueous solution then makes it possible to form the low-salt, readily soluble lithium salts of the black stilbene dyes employed and to recover the lipophilic amines.

The stilbene dye salts of the formula (I) according to the invention can be isolated from the preferably aqueous reaction mixtures obtained initially by means of customary methods of working up: for example, by salting out, filtration or spray drying, directly or following demineralization by means of membrane filtration. Alternatively, isolation can be dispensed with and a solution comprising the dye salt of the formula (I) according to the invention can be converted directly into concentrated dye solutions or recording liquids by adding organic bases, organic solvents and/or hydrotropic substances.

Examples of suitable organic bases are monoethanolamine, diethanolamine, triethanolamine, 2-aminopropanol, 3-aminopropanol, dipropanolamine, tripropanolamine, N-methylaminoethanol, N,N- dimethylaminoethanol, N-phenylaminopropanol, ethylenediamine, tetramethylethylenediamine, tetramethylpropylenediamine, tetramethylhexylenediamine, diethylenetriamine, triethylenetetramine or polyethylenimine.

Examples of organic solvents and hydrotropic compounds which can be employed are formamide, urea, tetramethylurea, □-caprolactam, ethylene glycol, diethylene glycol, triethylene glycol, polyethylene glycol, butyl glycol, methyl-Cellosolve, glycerol, N-methylpyrrolidone, 1,3-diethyl-2-imidazolidinone, thiodiglycol, sodium xylenesulfonate, sodium cumenesulfonate or sodium butyl monoglycol sulfate. Hydrotropic compounds are described, for example, in Melliand 43, 718 (1962), Angew. Chem. 63, 327 (1951).

The stilbene dyes of the invention are also suitable for the dyeing and printing of cotton, polyamide, paper or leather or as colorants in electrophotographic toners and developers, such as one-component and two-component powder toners, magnetic toners, liquid toners, polymerization toners, and also other specialty toners, and in powder coating materials.

The dye salts of the invention are also suitable as colorants for color filters and also for both additive and subtractive color generation (see for example P. Gregory, "Topics in Applied Chemistry: High-Technology Applications of Organic Colorants", Plenum Press, New York, 1991, pp. 15–25).

In particular, the dyes of the formula (I) of the invention are suitable for the preparation of recording liquids for the inkjet printing process and also for preparing inks for other printing, copying, marking, writing, drawing, stamping or registering processes.

In this context, black printed images of excellent quality are obtained which are notable for high brightness, print definition and optical density and also for excellent light fastness, abrasion resistance and water fastness, even on standard, uncoated paper stocks.

The present invention additionally provides recording liquids which comprise one or more of the water-soluble stilbene dyes of the formula (I).

The finished recording liquids generally comprise in total from 0.5 to 15% by weight, preferably from 1.5 to 8% by weight (calculated on a dry basis), of one or more, for example, 2 or 3, soluble dyes of the formula (I). Judiciously, from 5 to 99% by weight of water and from 0.5 to 94.5% by weight of organic solvent and/or hydrotropic compounds are present.

In one preferred embodiment, ready-to-use recording liquids comprise from 0.5 to 15% by weight of dye of the formula (I), from 40 to 85% by weight of water and from 10 to 50% by weight of organic solvent and/or hydrotropic compounds; in another embodiment, from 0.5 to 15% by weight of dye of the formula (I), from 5 to 20% by weight of water and from 70 to 94.5% by weight of organic solvent and/or hydrotropic compounds. The recording liquids may also include further additives, which are mentioned below.

Water used to prepare the recording liquids is preferably employed in the form of distilled or deionized water. The solvents present in the recording liquids may comprise an organic solvent or a mixture of such solvents, with preference being given to water-miscible solvents. Examples of suitable solvents are mono- or polyhydric alcohols, their ethers and esters, examples being alkanols, especially of 1 to 4 carbon atoms, such as methanol, ethanol, propanol, isopropanol, butanol and isobutanol; dihydric or trihydric alcohols, especially of 2 to 6 carbon atoms, examples being ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol and polypropylene glycol; lower alkyl ethers of polyhydric alcohols, such as ethylene glycol monomethyl, monoethyl or monobutyl ether, triethylene glycol monomethyl or monoeethyl ether; ketones and ketone alcohols, such as acetone, methyl ethyl ketone, diethyl ketone, methyl isobutyl ketone, methyl pentyl ketone, cyclopentanone, cyclohexanone and diacetone alcohol; amides, such as dimethylformamide, dimethylacetamide and n-methylpyrrolidone; and also tetramethylurea, or thiodiglycol.

In addition, the recording liquids of the invention may comprise customary additives, examples being preservatives, cationic, anionic or nonionic surface-active substances (surfactants and wetting agents), and also viscosity regulators, for example, polyvinyl alcohol, cellulose derivatives, or water-soluble natural or synthetic resins as film formers and/or binders for enhancing the adhesive strength and abrasion resistance.

Amines, such as ethanolamine, diethanolamine, triethanolamine, N,N-dimethylethanolamine or diisopropylamine, for example, serve primarily to increase the pH of the recording liquid. They are normally present in proportions of from 0 to 10% by weight, preferably from 0.5 to 5% by weight, in the recording liquid.

Depending on the embodiment of the printing process as, for example, a continuous jet, intermittent jet, impulse jet or compound jet process, further additives may be added to the recording liquids for the inkjet printing process, in order, for example, to buffer the pH or to adjust the electrical conductivity, specific heat, thermoexpansion coefficient and thermal conductivity.

The storage of recording liquids of the invention is not accompanied by the deposition of precipitates leading to poorly defined printed images or nozzle blockage.

In terms of viscosity and surface tension, the recording liquids of the invention are within the ranges suitable for the inkjet process. They give printed images of high optical density with excellent light fastness, water fastness, abrasion resistance and resolution.

The examples which follow serve to illustrate the invention without, however, restricting it. The indications relating to purity are percentages by weight.

EXAMPLE 1

Preparing the Dye Acid 100 g of the black stilbene dye of the formula (A) with a dye purity of 60% (remainder: sodium chloride and sodium sulfate) are introduced in portions with stirring into 550 g of 8% strength aqueous sulfuric acid at 20–25° C. The suspension in sulfuric acid is slowly heated to 70° C. in the course of 1 hour and is subsequently stirred at 70° C. for 2 hours.

It is then filtered and the filtercake is washed with 100 g of 8% strength sulfuric acid and 500 g of methanol.

Drying at 50° C. under reduced pressure gives a black dye powder of the stilbene dye in the form of the free acid, with a dye purity of 91.7% (Cu content: 10.0%).

EXAMPLE 2

5.0 g of the dye acid obtained in Example 1 are introduced at 20–25° C. into a mixture of 33.0 g of diethylene glycol, 40 ml of deionized water and 16 ml of 1 N lithium hydroxide solution. The mixture is stirred at 25° C. for 1 hour and then a final weight of 100.0 g is established using deionized water.

The result is a residue-free solution of the black stilbene dye in the form of the lithium salt, which has a pH of 7.7, and good storage stability and is outstandingly suitable as an ink for inkjet printing processes. Printed images of high optical density, good water fastness and outstanding light fastness are obtained.

EXAMPLE 3

Following the procedure of Example 2 but using, instead of 16 ml of 1 N lithium hydroxide solution, a mixture of 9 ml of 1 N lithium hydroxide solution and 1.0 g of diethanolamine gives a storage-stable solution of the black stilbene dye in the form of the mixed lithium/diethanolammonium salt, which is outstandingly suitable as an ink for inkjet printing processes, giving printed images of excellent light fastness and print definition.

COMPARATIVE EXAMPLE 5,0 g of the dye acid obtained in Example 1 are introduced into a mixture of 33.0 g of diethylene glycol, 16 ml of 1 N sodium hydroxide solution and 40 ml of deionized water. Following the establishment of a final weight of 100.0 g with deionized water, the black stilbene dye of the formula (A) is obtained in the form of the sodium salt. In the resultant mixture, this dye has largely precipitated. This mixture is unsuitable as an ink for the inkjet printing process, since the precipitated dye causes blockage at the nozzles of the printing head, and the print procedure is interrupted.

The table below lists further black stilbene dye salts of the formula (IB) of the invention

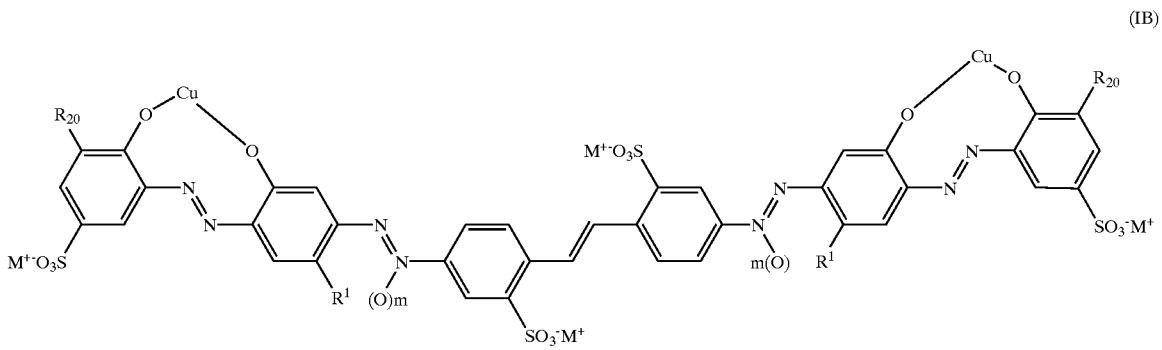

(IB)

which were prepared in accordance with Example 2 or 3 and which are outstandingly suitable for the preparation of inks for inkjet printing processes.

In this table, in the column "$M^+$"

$M^2$=protonated commercial ethoxylated coconut fatty amine with 2 EO units $M^3$=protonated commercial ethoxylated coconut fatty amine with 15 EO units $M^4$=protonated commercial oleylamine with 2 EO units $M^5$=protonated commercial tallow fatty amine with 2 EO units $M^6$=protonated commercial ethoxylated stearylamine with 8 EO units "EO" denotes ethylene oxide.

TABLE

Black Stilbene dye salts of the formula (B)

| Example | $R^1$ | $R^{20}$ | m | $M^+$ |
|---|---|---|---|---|
| 4 | $OCH_3$ | H | 1 | $H_3N^+CH_2CH_2OH$ |
| 5 | $OCH_3$ | H | 0 | $Li^+$ (50 mol %)/ $HN^+(CH_2CH_2OH)_3$ (50 mol %) |
| 6 | $OCH_3$ | H | 1 | $Li^+$ (75 mol %)/ $Na^+$ (25 mol %) |
| 7 | $OCH_3$ | $SO_3M$ | 1 | $Li^+$ |
| 8 | $OC_2H_5$ | $SO_3M$ | 1 | $Li^+$ (50 mol %)/ $M^2$ (50 mol %) |
| 9 | $CH_3$ | H | 1 | $H_3CNH^+(CH_2CH_2OCH_2CH_2OH)_2$ |
| 10 | $CH_3$ | H | 1 | $Li^+$ |
| 11 | $OCH_3$ | H | 1 | $Li^+$ (80 mol %)/ $M^3$ (20 mol %) |
| 12 | $OCH_3$ | H | 1 | $H_2N^+(CH_2CH_2OH)_2$ (70 mol %)/ $M^4$ (30 mol %) |
| 13 | $OCH_3$ | H | 1 | $Li^+$ (80 mol %)/ $M^5$ (20 mol %) |
| 14 | $OCH_3$ | Cl | 1 | $CH_3NH^+(CH_2CH_2OH)_2$ |
|  | $OCH_3$ | $NO_2$ | 1 | (90 Mol %)/$M^6$ (10 mol %) |
| 15 | $OCH_3$ | COOH | 1 | $Li^+$ |
| 16 | $OCH_3$ | H | 1 | $Li^+$ |
| 17 |  |  |  | $Li^+$ |
| 18 |  |  |  | $(H_3C)N(CH_2CH_2OH)_3$ |

What is claimed is:

1. A dye of the formula (I)

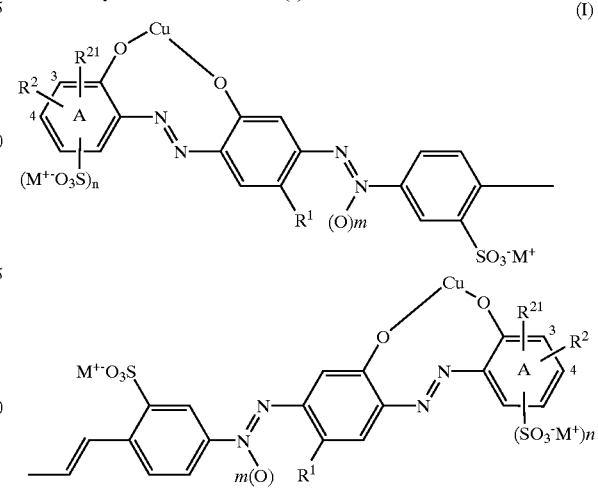

(I)

in which $R^1$ is hydrogen, alkyl of 1 to 4 carbon atoms, or alkoxy of 1 to 4 carbon atoms;

$R^2$ is hydrogen, carboxyl, chloro or nitro;

$R^{21}$ is hydrogen; or $R^2$ and $R^{21}$ together form a benzene ring which is fused on in positions 3 and 4 of the ring A and optionally carries 1, 2 or 3 sulfo groups;

m is a number from 0 to 1;

n is a number from 0 to 2;

$M^+$ is a cation or a mixture of different cations, at least one equivalent of the cations $M^+$ per mole of the dye being lithium cations, cations of the formula (II)

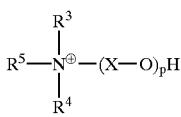

(II)

where p is a number from 1 to 30; or a combination thereof;

X is $CH_2CH_2$, $CH(CH_3)CH_2$, $CH_2CH(CH_3)$ or a combination thereof and $R^3$, $R^4$ and $R^5$ independently of one another are hydrogen, a group of the formula (III)

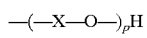

(III)

or an aliphatic radical of 1 to 18 carbon atoms.

2. The dye as claimed in claim 1, wherein p is a number from 1 to 15.

3. The dye as claimed in claim 1, wherein M is a mixture of lithium cations and cations of the formula (II).

4. The dye as claimed in claim 1, wherein $R^1$ is hydrogen, methyl, ethyl, methoxy or ethoxy.

5. The dye as claimed in claim 1, wherein $R^{21}$ is hydrogen.

6. The dye as claimed in claim 1, which is of the formula (IB)

in which $R^{20}$ is hydrogen, sulfo, chloro, nitro or carboxyl.

7. The dye as claimed in claim 1, wherein the amine on which the formula (II) is based is ethanolamine, diethanolamine, triethanolamine, N-methyl-N-ethanolamine, N-methyl-N-diethanolamine, 2-(2-hydroxyethoxy)ethanamine, di(2-(2- hydroxyethoxy)ethan) amine, tri(2-(2-hydroxyethoxy)ethan)amine, ethoxylated or propoxylated ammonia, a primary, secondary or tertiary aliphatic amine having 1 or 2 $C_1$–$C_{18}$-alkyl radicals and 2 or 1 (poly)oxy($C_2$–$C_3$)-alkylene chains having from 1 to 30 hydroxyethyl, hydroxypropyl or both units in the chain.

8. The dye as claimed in claim 1, wherein the amine on which the formula (II) is based is an ethoxylated or pro- poxylated coconut fatty amine, sperm oil fatty amine, stearylamine or tallow fatty amine having degrees of alkoxylation of from 2 to 25.

9. A process for preparing a dye of the formula (I)

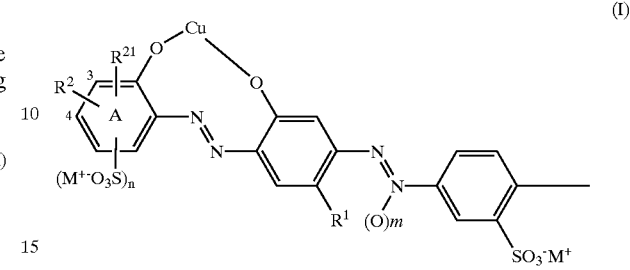

(I)

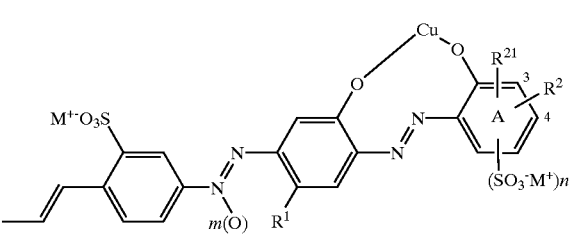

in which $R^1$ is hydrogen, alkyl of 1 to 4 carbon atoms, or alkoxy of 1 to 4 carbon atoms;

$R^2$ is hydrogen, carboxyl, chloro or nitro;

$R^{21}$ is hydrogen; or $R^2$ and $R^{21}$ together form a benzene ring which is fused on in positions 3 and 4 of the ring A and optionally carries 1, 2 or 3 sulfo groups;

m is a number from 0 to 1;

n is a number from 1 to 2;

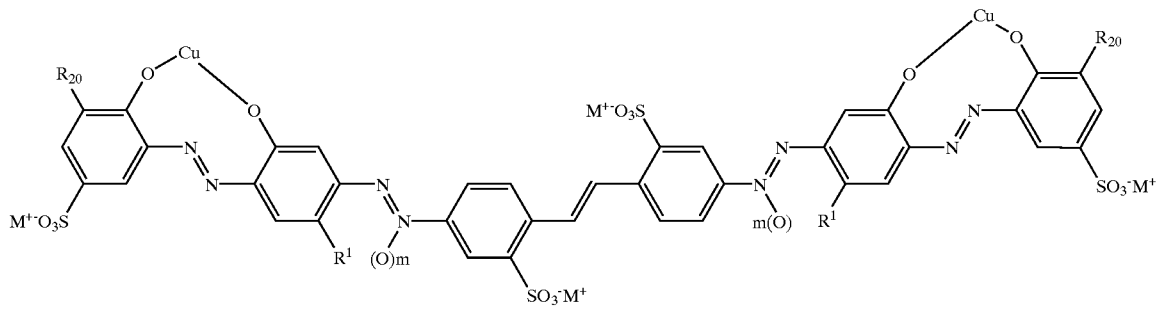

(IB)

$M^+$ is a cation or a mixture of different cations, at least one equivalent of the cations $M^+$ per mole of the dye being lithium cations, cations of the formula (II)

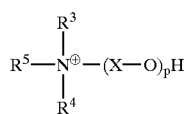

(II)

where p is a number from 1 to 30; or a combination thereof;

X is $CH_2CH_2$, $CH(CH_3)CH_2$, $CH_2CH(CH_3)$ or a combination thereof and $R^3$, $R^4$ and $R^5$ independently of one another are hydrogen, a group of the formula (III)

$$—(—X—O—)_pH \qquad (III)$$

or an aliphatic radical of 1 to 18 carbon atoms;
which comprises converting the sodium salt of the dye of the formula (I) in which M is Na in aqueous solution to the corresponding dye acid, using an acid, and reacting said dye acid with a lithium compound, an amine of the formula (VI), an ammonium hydroxide of the formula (VII)

$$R^3R^4N(—X—O—)_pH \qquad (VI)$$

$$R3R4R5N^\oplus(—X—O—)_{\overline{p}}—H \ \ OH^\ominus \qquad (VII)$$

in which $R^3$, $R^4$, $R^5$, X and p are as defined above or with a combination thereof; or
converting the sodium salt of the dye of the formula (I) to the corresponding, sparingly water-soluble or water-insoluble ammonium salt of the dye, using an ammonium salt of a lipophilic amine, separating off said ammonium salt and then reacting it in aqueous solution with a lithium compound, an amine of the formula (VI), an ammonium hydroxide of the formula (VII) or with a combination thereof.

10. The process for preparing a dye of the formula (I) as claimed in claim 9 wherein M is Li, comprising condensing a compound of the formula (IV)

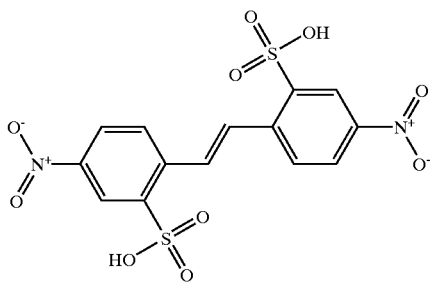

with a compound of the formula (V)

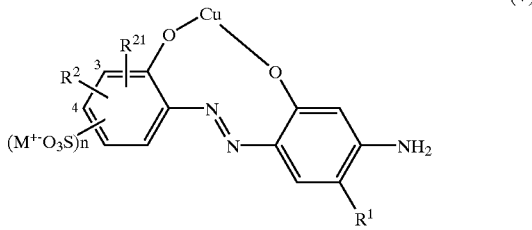

in the presence of aqueous lithium hydroxide at a temperature from 60 to 140° C.

11. A recording liquid comprising from 0.5 to 15% by weight of one or more dyes as claimed in claim 1.

12. The recording liquid as claimed in claim 11, comprising from 1.5 to 8% by weight of said dyes.

13. The recording liquid as claimed in claim 11, comprising from 0.5 to 15% by weight of one or more of the dyes, from 5 to 99% by weight of water and from 0.5 to 94.5% by weight of organic solvent, hydrotropic compounds and, optionally, further customary additives.

14. The recording liquid as claimed in claim 11, comprising from 0.5 to 15% by weight of one or more of the dyes, from 5 to 20% by weight of water and from 70 to 94.5% by weight of organic solvent, hydrotropic compounds and, optionally, further customary additives.

15. The recording liquid as claimed in claim 11, wherein said recording liquid is an ink-jet ink.

* * * * *